United States Patent [19]

Albers

[11] Patent Number: 4,609,697

[45] Date of Patent: Sep. 2, 1986

[54] HOT MELT ADHESIVE FOR BONDING ARTICLES MADE OF ETHYLENE-PROPYLENE TERPOLYMER

[75] Inventor: Günter Albers, Hamburg, Fed. Rep. of Germany

[73] Assignee: Phoenix Aktiengesellschaft, Hamburg-Harburg, Fed. Rep. of Germany

[21] Appl. No.: 641,332

[22] Filed: Aug. 16, 1984

[51] Int. Cl.$^4$ ............................................... C08L 95/00
[52] U.S. Cl. ........................................ 524/68; 524/70; 524/71; 524/499; 524/505; 525/92; 525/95; 525/97
[58] Field of Search ............... 525/92, 97, 95; 524/68, 524/70, 71, 499, 505

[56] References Cited

U.S. PATENT DOCUMENTS

| | | | |
|---|---|---|---|
| 4,042,555 | 8/1977 | Raimondi | 260/29.6 RB |
| 4,145,377 | 3/1979 | Bussink et al. | 524/144 |
| 4,361,663 | 11/1982 | Agarwal et al. | 524/71 |
| 4,481,323 | 11/1984 | Sterling | 524/504 |

FOREIGN PATENT DOCUMENTS 318779 11/1974 Austria .
340548 12/1977 Austria .

OTHER PUBLICATIONS

Chemical Abstracts, vol. 87, 15323a, (1977).
Chemical Abstracts, vol. 100, 211262h (1984).

*Primary Examiner*—Melvyn I. Marquis
*Attorney, Agent, or Firm*—Collard, Roe & Galgano

[57] ABSTRACT

There is provided a hot melt adhesive for bonding shaped articles and surface structures of ethylene-propylene terpolymer (EPDM) between one another, or with other materials, consisting 100 parts by weight of styrene-ethylene-butylene-styrene block copolymer rubber; 10-150 parts by weight phr (per hundred rubber) aliphatic hydrocarbon resins; 50-300 parts by weight phr (per hundred rubber) aromatic hydrocarbon resins; and up to 1,000 parts by weight phr (per hundred rubber) bitumin with a softening point, according to the Ring and Ball method (DIN test 52011), 37/44-54/59.

3 Claims, No Drawings

HOT MELT ADHESIVE FOR BONDING ARTICLES MADE OF ETHYLENE-PROPYLENE TERPOLYMER

The present invention relates to a hot melt adhesive for bonding together shaped articles and surface structures made of ethylene-propylene terpolymer, or EPDM, or bonding such articles with other materials as they are available in the state of the art.

During the bonding of rubber based articles, there are usually used solutions containing a certain proportion of solid materials. However, use of such adhesives dissolved in a solution causes difficulties when the articles have large bonding surfaces, since the solvents must be removed from the article and the adhesive after use. For such particular tasks there are therefore used to a large extent hot melt adhesives. Such hot melt adhesives are free of solvents but must be heated to a higher temperature of, for example, 150° C., so as to generate a firmly adhering connection, before they can be used for bonding. The hot melt adhesives available on the market, although they have wide applicability, cannot, however, be used with articles having an EPDM base. In this synthetic rubber, the adhesive values are inadequate and the adhesion is not sufficiently permanent. It has been proposed to provide for the connection of surfaces, for example, as they occur in roof sealing cracks, that fibrous material projects from the surfaces, as a result of which a mechanical clamping is accomplished. But the problem of obtaining a seam cannot be solved in this manner. In addition, there has also been used hot melt adhesives which contain a mixture of EPDM butadienstyrene-mixture polymiserates, and bitumin. Such adhesive connections require a vulcanization station, however, and are therefore limited to few applications. Furthermore, the costs of such adhesive connections are relatively high.

It is, therefore, an object of the present invention to devise a hot melt adhesive, wherein at least one of the surfaces to be connected consists of EPDM. A particular field of application are sealing cracks and construction lines during high-rise and below ground construction, which find application for sealing purposes of all kinds. Surfaces and seam regions of this type should be connected in a single process utilizing only one adhesive.

This object, as well as others which will hereinafter become apparent, is accomplished according to the present invention by providing a hot melt adhesive consisting of the following components:

(a) 100 parts by weight S-EB-S-block copolymer rubber;
(b) 10–150 parts by weight phr (per hundred rubber) aliphatic hydrocarbon resins;
(c) 50–300 parts by weight phr (per hundred rubber) aromatic hydrocarbon resins; and
(d) up to 1,000 parts by weight phr (per hundred rubber) bitumin with a softening point, according to the Ring and Ball method (DIN test 52011), of 37/44–54/59.

DIN is an abbreviation for German Industrial Standard. The determination of the softening point according to the Ring and Ball method under DIN 52011 involves the use of a steel ball of defined weight placed on a layer of binder as a test specimen which is contained in a ring with specified dimensions. The test specimen is uniformly heated in a test liquid under specified conditions and the temperature at which the test specimen experiences a defined deformation is measured as the softening point. According to the test, two rings are utilized, each having an upper segment of 19.9 mm internal diameter and a lower segment of 15.9 mm internal diameter. The depth of the upper segment is 3.6 mm and the depth of the lower segment is 2.8 mm for a combined axial depth of 6.4 mm. All dimensions are plus or minus 0.2 mm. The two rings are heated to about the pouring temperature of the test specimen or sample and placed on a plate thinly smeared with a mold release agent. The pourable test specimen or sample is filled into the rings in such a way that the solidified sample projects beyond the top edge of the rings. After cooling to room temperature, the excess is cut off in such a way that the surface of the sample is smooth and plane.

The rings thus prepared are placed on a ring holding plate which holds the rings in a single plane on a rack positioned within a beaker which contains the test liquid such that the total height of the test liquid is 100 mm. The ring holding plate is so positioned that the upper level of the rings is 50 mm below the level of the test liquid and the bottom level of the rings is 25.4 mm above a bottom plate also secured to the rack. The bottom plate is positioned 16.3 mm above the bottom of the beaker. A thermometer is positioned in the beaker and supported at its bottom end at the level of the rings. The balls, formed of steel weighing 3.5 grams each and having a diameter of 9.525 mm, are first placed in an initial position on centering devices positioned above the rings so that the balls do not initially contact the test samples. The type of test liquid and the thermometer to be used as well as the initial temperature depend on which softening point of the test sample is expected. If between 25° and 80° C. freshly boiled water is used as the test liquid and an initial temperature of 5° C. Where the expected softening point is over 80° C. and less than 110° C., glycerin is used as the test liquid and the initial temperature of 30° C. is used. In the case of a softening point of over 110° C., glycerol is used as the test liquid with an initial temperature of 30° C. A thermometer appropriately calibrated for these temperatures is used.

According to the test method, the test liquid is maintained for fifteen minutes at the initial temperature indicated. The balls are then permitted to slide onto the test samples from the centering device. The beaker is then heated so that the temperature of the test liquid uniformly rises within one minute by 5° C. The first three minutes serve for setting the temperature increase. After a temperature increase of 15° C., only a deviation of plus or minus five seconds per minute at most is permissible for each temperature increase of 5° C. The test samples soften gradually as the temperature rises and are arched downwardly under the pressure of the balls supported thereon. For each of the two rings, a temperature reading from the thermometer is taken at the moment when the binder or test sample touches the bottom plate. This temperature establishes the softening point of the material according to this method.

In the above-named S-EB-S-block copolymer, one deals with a polymer in which the center block consists of ethylene-butylene, and the two end blocks consist of styrene obtainable from Deutsche Shell Chemie GmbH as KRATON G thermoplastic rubber (KRATON being a registered trademark). The ratio of styrene to olefin is approximately 30:70. The molecular weight lies in the value or range of conventional rubber types. In the case of the aliphatic hydrocarbon resin one deals with a polymer of petroleum fractions as a byproduct from the processing of petroleum obtained during steam cracking. The significance is that the resin has $C_4$ and $C_5$ hydrocarbons, a softening point of about 100° C. according to the Ring and Ball method, the acid number and saponification number being less than 1, and a specific gravity of 1.05 g/cm³. In the aromatic hydrocarbon resin, one can deal, for example, with an alphamethyl-styrene-copolymer. However, a polyterpene resin can also be used. The aromatic hydrocarbon resin would have a softening point of about 100° C. (Ring and Ball method), the acid number and saponification number being less than 1, and a specific gravity of 1.06 g/cm³.

The proportional amounts designated for the two resins have to be matched to one another, so as to insure a proper action with the S-EB-S. These resins can influence the physical properties of the hot melt adhesive and the processing state.

For the bitumins, certain softening limitation values are to be maintained, which are of significance for processing the hot melt adhesive. In this regard, bitumins of conventional origin, but also bitumins changed in their structure by oxidation can be used. Examples are:

|  | Penetration at 25° C. in 0.1 min (DIN 52010) | Softening Point (Ring and Ball DIN 52011) | Breaking Point following Fraass (DIN 52012) (max. °C.) |
|---|---|---|---|
| Bitumen 85/25 (Blown Bitumen) | 20–30 | 80–90° C. | −10 |
| Bitumen B80 (Standard Bitumen per DIN 1995) | 70–100 | 44–49° C. | −10 |
| Bitumen B200 (Standard Bitumen per DIN 1995) | 160–210 | 37–44° C. | −15 |

When composing a hot melt adhesive according to the aforesaid components, it is possible to obtain an effective adhesion property without the addition of any bitumins. However, it is advantageous, taking into account that hot melt adhesives are applied in most cases in large quantities, to provide a large proportion of bitumins. By this means, the cost for the adhesive process can be considerably lowered. It has also been shown that an admixture of bitumins results in an insignificantly lower resistance to peeling and higher temperatures.

According to the present invention, it is further possible to replace up to 20% of S-EB-S with S-EP-S. In this rubber, one also deals with a block copolymer with styrene groups at the ends. The olefin centerblock, in contrast, however, consists of ethylenes and propylenes. By the addition of S-EP-S, the consistency can be changed, and the minimum temperature of the heating process can be somewhat lowered, so that the adhesion property of the hot melt adhesive remains effective for a greater length of time.

According to the invention, it is also possible to add to the hot melt adhesive up to 150 parts by weight phr (per hundred rubber) inorganic filling material. Here, for example, chalk and silicic acid may be considered. This addition does not lead to any disadvantageous influence on the adhesive effect, although as a result of this addition, the cost for a hot melt adhesive can be reduced.

The invention may be further clarified by means of the following examples wherein the values of the components are given in parts by weight:

| S-EB-S | — | — | 100 | 80 | 80 | 100 | 100 | 100 |
|---|---|---|---|---|---|---|---|---|
| S-EP-S | — | — | — | 20 | 20 | — | — | — |
| Aliphatic Hydrocarbon Resin | — | — | 100 | 100 | 100 | 100 | 100 | 100 |
| Aromatic Hydrocarbon Resin | — | — | 50 | 50 | 50 | 50 | 50 | 50 |
| Bitumin 85/25 | 100 | — | — | — | — | — | — | — |
| Polymer-bitumin (12% styrene-butadiene-styrene, and 82% Bitumin B200) | — | 100 | — | — | — | — | — | — |
| Bitumin B80 | — | — | — | — | — | 250 | 250 | — |
| Mineral Fillers | — | — | — | — | 50 | — | — | — |
| Peel Strength (Newtons/mm) | | | | | | | | |
| at Room Temperature | 0.8 | 2.1 | 3.6 | 3.5 | 3.4 | 3.6 | 3.4 | 3.9 |
| at 80° C. | 0.2 | 0.3 | 1.8 | 1.3 | 1.3 | 1.5 | 0.4 | 1.8 |

It is understood that the foregoing general and detailed descriptions are explanatory of the present invention and are not to be interpreted as restrictive of the scope of the following claims.

What is claimed is:

1. A hot melt adhesive for bonding together two surfaces at least one of which is comprised of ethylene-propylene terpolymer, wherein the adhesive is comprised of the following components:
   (a) 100 parts by weight styrene-ethylene-butylene-styrene block copolymer rubber;
   (b) 10–150 parts by weight phr (per hundred parts of said rubber) aliphatic hydrocarbon resin;
   (c) 50–300 parts by weight phr (per hundred parts of said rubber) aromatic hydrocarbon resin; and
   (d) up to 1,000 parts by weight phr (per hundred parts of said rubber) bitumin having a softening point, according to the Ring and Ball method (DIN test 52011), of 37/44–54/59.

2. The hot melt adhesive according to claim 1, wherein the styrene-ethylene-butylene-styrene block copolymer is replaced up to 20% by styrene-ethylene-propylene-styrene block copolymer rubber.

3. The hot melt adhesive according to claim 1, which further includes up to 150 parts by weight phr (per hundred rubber) inorganic filling material.

* * * * *